Sept. 26, 1967 — J. D. McCUNE — 3,343,822
SPRAY-TYPE DUST REDUCER
Filed June 11, 1964
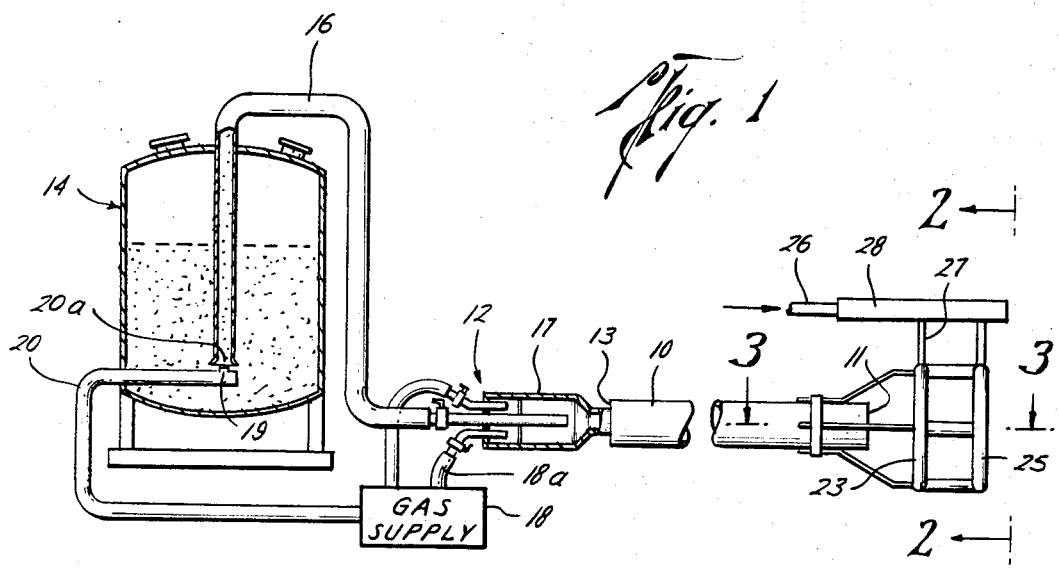
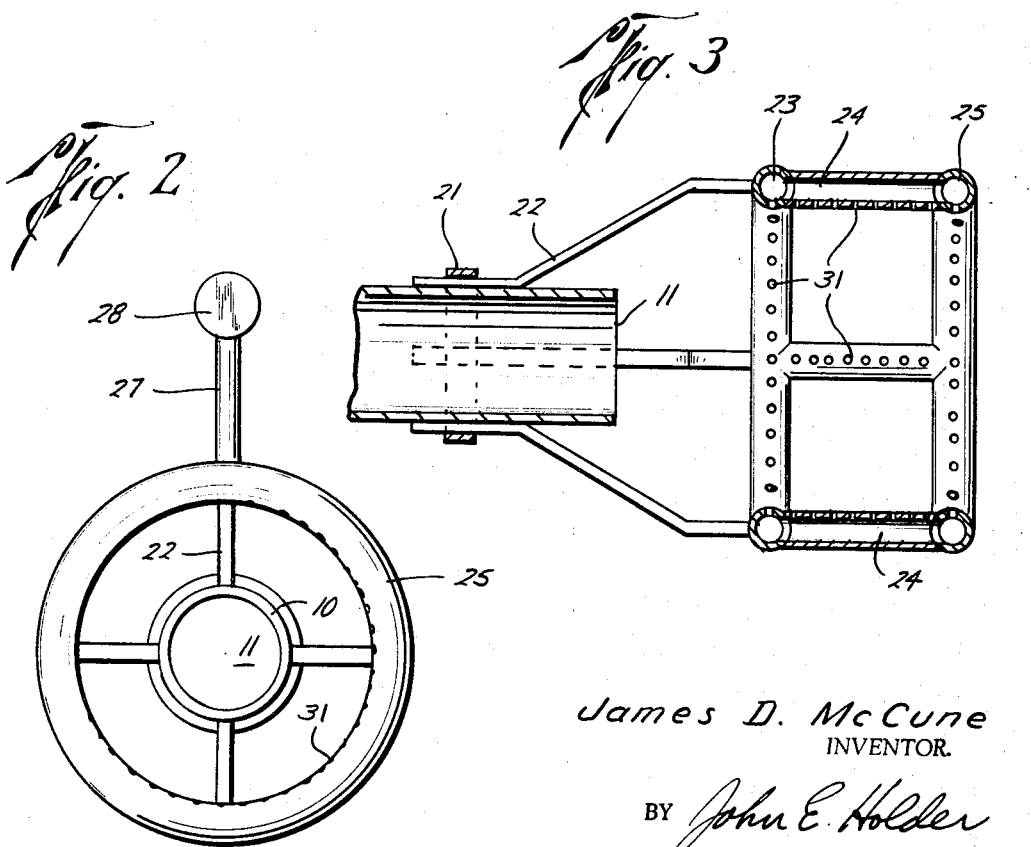
James D. McCune
INVENTOR.
BY John E. Holder
ATTORNEY United States Patent Office 3,343,822
Patented Sept. 26, 1967

3,343,822
SPRAY-TYPE DUST REDUCER
James D. McCune, La Porte, Tex., assignor, by mesne assignments, to Schlumberger Technology Corporation, Houston, Tex., a corporation of Texas
Filed June 11, 1964, Ser. No. 374,449
2 Claims. (Cl. 261—118)

This invention relates to an apparatus for controlling the discharge from a pipeline during a cleaning operation, and more particularly, to an apparatus for controlling the fine particle output discharged from a pipeline during internal sand cleaning operations.

A process has been developed for sand cleaning of pipelines in place in which sand grains or other abrasive material suspended in a gas or air stream are injected for a period of time into a section of pipeline, with the downstream end of the pipe open to the atmosphere. During this period of time the stream of gas and sand injected and actually flowing in the pipe may extend for a mile or mile and a half and is followed by a gas flow maintained after the sand injection has been cut off until the back end of the sand injected has cleared the open end of the pipeline. Following this, the gas flow is cut off and the pressure in the line is permitted to drop to zero whereupon the cycle is repeated. One method of determining the progress of the cleaning operation is by observation of the color of sand emerging from the end of the pipe.

The process set forth above is used to clean all types and sizes of lines including large diameter (30 inch) gas transmission lines and also relatively small diameter process pipelines used in industrial plants and refineries. This process is set forth in greater detail in U.S. Patent No. 3,073,687.

One problem which is encountered in cleaning plant or refinery lines, using this method, is the discharge of large volumes of sand and dust at relatively high velocities into the atmosphere around the plant. This discharge of sand and dust to the atmosphere presents hazards to health and to the maintenance of equipment which might be affected by dust and sand.

It is therefore an object of the present invention to provide an apparatus for controlling the discharge of particles of cleaning material from the open end of a pipeline during a cleaning operation.

It is a further object of this invention to provide an apparatus for controlling the discharge of cleaning material particles from a pipeline during a cleaning operation by spraying a liquid into the discharge stream of particles at a point spaced from the end of the pipeline to permit observation of the color of the particles prior to spraying the liquid on the particles.

With these and other objects in view the present invention contemplates an apparatus for spraying a liquid into a particle or dust-laden gas emitting from a pipeline during a cleaning operation wherein a ring-shaped tubular member is mounted in proximity to the end of a pipeline so that the tubular member surrounds the discharge path of gas and dust emitting from the end of the pipe. Small holes in the interior wall of the tubular ring permit water which is supplied to the ring to spray radially inwardly into the discharge stream of dust and gas thereby wetting the dust and settling out particles therein to prevent the particles from being carried into the air. The tubular ring is spaced from the end of the pipeline to facilitate observation of the dust as it emerges from the pipeline thereby permitting a determination of when the cleaning operation is completed.

A complete understanding of this invention may be had by reference to the following detailed description when read in conjunction with the accompanying drawings illustrating an embodiment thereof, wherein:

FIG. 1 is a schematic view of equipment for sand cleaning a pipeline with an apparatus embodying the present invention attached to the end of the pipeline;

FIG. 2 is an end view taken along line 2—2 of FIG. 1;

FIG. 3 is a sectional plan view taken along line 3—3 of FIG. 1 of the apparatus embodying the present invention including means for spraying a liquid into a dust-laden gas emitting from the end of a pipeline.

Referring first to FIG. 1, a section of pipe 10 is shown with the downstream end 11 exposed to the atmosphere and a sand-injection apparatus 12 coupled to the upstream end 13 of the pipe. A sand-supply apparatus includes a sand dispensing or supply vessel 14 from which a mixture of sand and gas is supplied or delivered through one or more suitable supply hoses 16 to a delivery and agitating nozzle of injector head 17. Gas under pressure is supplied to the injector head through pipes 18a to provide an impelling or agitating force to the delivered mixture of sand and gas in order to introduce the mixture at proper velocities into the pipeline to be cleaned. This gas is supplied to the sand container and also to the injection head from a gas or air supply 18. As gas is introduced into the lower end of the sand supply container through an opening 19 in the pipe 20, sand is entrained into the stream of gas flowing into the inlet end 20a of the pipe 16 and this gas carries the sand upwardly through the pipe 16 and into the injection head. As the gas is supplied to the injection head through the pipes 18a, the sand and gas mixture which is being delivered to the injection head through the pipe 16 is further agitated by the gas from pipes 18a and carried through the pipe section to scour and clean the interior of the pipe, with the sand and gas mixture finally emerging from the open end 11 of the pope and into the atmosphere.

In FIG. 3 a detailed view of the apparatus embodying the present invention shows the appartus attached to the end 11 of the pipe open to the atmosphere through which end the sand and gas are discharged. This device includes a clamp 21 for connection about the outer periphery of the pipe. Support members 22 extend from the clamp longitudinally along the pipe and also extend beyond the end of the pipe. It will be appreciated that the clamp and supports can be made adjustable to fit various diameters of pipe. A ring-shaped circular tube 23 having a diameter larger than that of the end of the pipe is attached (such as by welding) to the support members 22 at a point spaced from the end of the pipe. A second ring-shaped circular tube 25 is spaced from the tube 23 and connected to the tube 23 by longitudinally extending tubes or pipes 24. The circular tubes 23 and 25 are open to the longitudinally extending tubes 24 which connect the two circular tubes to provide fluid communication between the circular tubes. Small holes or nozzles 31 are spaced along the interior circumferential wall of the hollow ring-shaped tubes and along the inwardly facing wall of the longitudinal connecting pipes 24. A manifold 28 (FIG. 1) is connected through vertical pipes 27 to the tubular rings 23 and 25. A hose 26 is attached to the manifold for supplying water or other liquid to the manifold and thus to the ring-shaped tubes 23, 25 and longitudinal pipes 24.

As shown in FIGS. 2 and 3, the ring-shaped tubes which have a larger diameter than the diameter of the pipe to be cleaned are concentrically mounted about the discharge end 11 of the pipe. Water or other liquid which is supplied to the apparatus through the hose 26 is carried through the manifold 28 and branch pipes 27 into the tubular rings 23, 25 and longitudinal pipes 24. The holes or nozzles 31 which are spaced along and through the interior walls of the ring-shaped tubes and longitudinal pipes permit the water or other liquid to spray radially inwardly toward a point aligned with the longitudinnal axis of the pipeline to be cleaned.

In the operation of this apparatus sand or other abrasive material is forced into the injector head of the sand-cleaning device 12 wherein gas or air under pressure is mixed with the sand and forces the sand into and through the pipe to sand blast or scour the interior of the pipe. As the sand laden gas emerges from the open end of the pipe to the atmosphere, water is sprayed through the dust-reducing apparatus to dampend sand and dust particles emerging from the open end of the pipe causing them to fall or settle out rather than being blown into the atmosphere.

The spray apparatus, including the ring-shaped tubes 23, 25 and pipes 24, is positioned on the supports 22 at a distance from the discsharge end 11 of the pipe to leave a sufficient space between the end of the pipe and the first ring-shaped tube 23 to permit visual inspection of the sand emerging from the end of the pipe before the sand or dust is wetted. Since the color of the sand emerging from the pipe is indicative of the progress of the sand cleaning operation, the observation of the sand color prior to the wetting of the discharge is important to the cleaning operation.

While a particular embodiment of the present invention has been shown and described it is apparent that changes and modifications may be made without departing from this invention in its broader aspects and therefore, the aim in the appended claims is to cover all such changes and modifications as fall within the true spirit and scope of this invention.

What is claimed is:

1. In an apparatus for cleaning a pipe including means for injecting a cleaning material into a first end of the pipe and means for propelling the cleaning material out of a second end of the pipe, the combination of means for settling out dust discharged from the second end of the pipe during the cleaning operation comprising, means for spraying liquid into the dust discharged from the second end of the pipe to wet and settle out the dust, and means permitting observation of dry dust discharged from the pipe before the dust is wetted by the means for spraying liquid including support means attaching the means for spraying liquid to the second end of the pipe and spacing the means for spraying liquid radially and longitudinally from the second end of the pipe along an extension of the longitudinal axis of the pipe.

2. The apparatus of claim 1 wherein said means for spraying liquid includes a pair of ring-shaped tubular members attached to said support means, pipe members disposed parallel to the longitudinal axis of the pipe and connected between said tubular members for providing fluid communication between said tubular members, and spaced openings in the inwardly facing walls of said tubular members and pipes, said openings being arranged to spray a liquid radially inwardly toward an extension of the longitudinal axis of the pipe.

References Cited

UNITED STATES PATENTS

| 155,465 | 9/1874 | Ramely | 261—118 X |
| 723,531 | 3/1903 | Jackson. | |
| 1,016,491 | 2/1912 | Guild. | |

FOREIGN PATENTS

| 925,711 | 5/1963 | Great Britain. |
| 32,077 | 4/1921 | Norway. |

HARRY B. THORNTON, *Primary Examiner.*

E. H. RENNER, *Assistant Examiner.*